United States Patent Office 3,424,601
Patented Jan. 28, 1969

3,424,601
GELLED TRICRESYL PHOSPHATES
James P. Hamilton, Pasadena, Md., assignor to FMC Corporation, a corporation of Delaware
No Drawing. Filed June 6, 1966, Ser. No. 555,278
U.S. Cl. 106—177    3 Claims
Int. Cl. C08b 21/06, 27/58, 27/62

ABSTRACT OF THE DISCLOSURE

A triorganic phosphate composition suitable for coating viscous-impingement air filters characterized by high thixotropy and desirable resistance to syneresis at ordinary ambient temperatures, which consists essentially of 96–99.6% of a triaryl phosphate, from about 0.2–2% of a cellulose acetate butyrate, having a high ratio of butyryl to acetyl and soluble in the triaryl phosphate at ambient temperatures, and from about 0.2–2% of cellulose acetate butyrate gelling agent with a high ratio of acetyl to butyryl and which is soluble in the triaryl phosphate when hot, but insoluble at ordinary ambient temperatures, said gelling agent being dispersed through the composition in finely divided form.

---

This invention relates to bodied, thixotropic, phosphate gel compositions suitable for coating dust filter media in air filters.

Viscous-impingement type industrial air filters contain porous filter media or mats through which air is passed. The filter medium is coated with a stable, non-volatile liquid which entraps dust particles as they pass through the filter and prevents them from becoming re-entrained in the air stream. However, loss of this liquid coating during use results in a lowering of the cleaning capacity of the filter. The liquid may be blown off the filter media by the high air velocities encountered, for example, with diesel engine filters. Moreover, when the filter medium is tightly wound around spools, as in the recently developed replacement filters, the liquid coating tends to be squeezed out.

It has been proposed to overcome these defects by bodying a liquid triaryl phosphate with thickening agents, which will produce a highly thixotropic body in the coating composition, enabling application at high shear rates at which the compositions are light in body, while the highly thixotropic nature of the composition insures a sufficiently high body once the source of shear has been removed. One successful method of obtaining this high thixotropy is disclosed in U.S. Patent application, Ser. No. 314,532, filed Oct. 17, 1963 now U.S. Patent 3,297,460. In this application, there is disclosed the use of a finely divided pyrogenic silica in triaryl phosphate compositions in combination with a soluble resin and a surfactant. However, these compositions are expensive because of the inclusion of the very expensive pyrogenic silica, and because of the difficulty of dispersing the silica in the composition.

A cheaper method of providing gelation is disclosed in U.S. Patent 3,161,609 issued Dec. 15, 1964. In that patent, a liquid phosphate ester is used to dissolve a thermoplastic resin of the type made by polymerizing an unsaturated compound, and thixotropy is produced by dispersing therein a cellulose ester or a cellulose ether which is soluble in the resin when hot, but precipitates out when cold. This method of achieving the desired results produces thixotropic compositions which are not quite as highly thixotropic as desirable. Moreover, while they control syneresis to a considerable extent, there still is sufficient syneresis in the compositions so that there is an undesirable exudation from these gels when they are used.

The principal object of this invention is the preparation of compositions useful as coatings for dust filter media in which high thixotropic ratios are obtained at relatively low loadings of addants, together with complete protection against syneresis, so that acceptable compositions are obtained at minimum cost.

In accordance with this invention, the coating compositions comprise 96–99.6% of a triaryl phosphate, preferably tricresyl phosphate, from 0.2–2% of a cellulose acetate butyrate which is fully soluble in the triaryl phosphate both hot or cold, and from 0.2–2% of a cellulose acetate butyrate which is soluble in the composition when hot, but precipitates in the cold, so it acts as a gelling and thixotroping agent for the composition.

The compositions are extremely easy to make. It is only necessary to add the two types of cellulose acetate butyrate to the triaryl phosphate and heat to a sufficiently high temperature to dissolve both materials, generally of the order of 140° C. When the solution cools, the cellulose acetate butyrate precipitates out in extremely fine form to produce a material which is highly viscous to gelatinous when cold, but which breaks up under high shear, so that it is sufficiently thin to be coated on air filter media.

Any of the various liquid triaryl phosphates can be used for the purpose, but the commonest, most desirable and least expensive of these materials is tricresyl phosphate.

The cellulose acetate butyrate which is used as the resinous material to produce body may be any of the soluble variety which has a high ratio of butyryl to acetyl and which contains roughly 50% acyl residues. A typical satisfactory material is Eastman Chemicals' EAB–500–5 which contains 48% butyryl radical, 6% acetyl radical. The material requires a minimum of about 0.2% of this resin, and no more than about 2% should be used; optimum results are obtained in the range of 0.5–1.5%. The viscosity of the material under high shear is determined to large amount by the amount of this soluble cellulose ester added; above about 2%, the compositions get too viscous for ready application.

The cellulose acetate butyrate which is soluble hot and insoluble cold ordinarily has a high ratio of acetyl to butyryl content attached to the cellulose. A typical product sold by Eastman Chemicals as Half-Second Butyrate, contains about 37% combined acetyl and 13% combined butyryl, and this is typical of these materials which are soluble hot and insoluble cold. While these materials increase the viscosity of the compositions at high shear, they produce the desired high pseudoplastic ratios which are conducive to the desirable results. Improved properties are obtained as low as 0.2%; more than 2% produces undesirable viscosity at high shear rates. Optimum results are obtained with from 0.5–1.5% of this type of acetate butyrate.

As indicated above, all that it is necessary to do to make these compositions is to add the resins to the triaryl phosphate, heat to the range of 130–140° C. with stirring to effect solution, and allow the solution to cool. This results in compositions which are essentially no more expensive than the basic triaryl phosphates.

These compositions have the great advantage, as compared with the soluble resins described in U.S. Patent 3,161,609, of retaining their thixotropic ratios even when highly bodied. This is illustrated by the following example:

Example 1

Compositions were made by dissolving, in tricresyl phosphate 0.8% of Eastman Chemicals Half-Second Butyrate along with indicated proportions of soluble resin shown in the table below. Viscosities were measured on a Brookfield Viscometer Type LVF, using a No. 4 spindle at 25° C., at the speeds indicated in the table, to produce the indicated viscosity in centipoises. The pseudoplastic ratio is the ratio of viscosity at 6 r.p.m. to the viscosity at 60 r.p.m.

TABLE I.—EFFECT OF MODIFYING RESIN ON GEL VISCOSITY

| Soluble cellulose acetate butyrate (EAB-500-5) | Viscosity | | Pseudoplastic ratio |
|---|---|---|---|
| | 6 r.p.m. | 60 r.p.m. | |
| 0 | 8,200 | 2,050 | 4.0 |
| 0.5 | 11,500 | 3,050 | 3.8 |
| 1.0 | 18,000 | 4,590 | 3.9 |
| 1.2 | 21,100 | 5,300 | 3.8 |
| 2.0 | 38,000 | 9,800 | 3.9 |
| Polyvinyl acetate: | | | |
| 0 | 8,200 | 2,050 | 4.0 |
| 1 | 8,700 | 2,400 | 3.7 |
| 2 | 10,000 | 2,900 | 3.5 |
| 3 | 11,500 | 3,650 | 3.3 |
| 4 | 11,100 | 4,000 | 2.8 |
| 5 | 10,000 | 4,300 | 2.3 |

It will be noted that the thixotropic ratio remains fairly steady over the viscosity range of 2050 to 9800 centipoises for the soluble acetate butyrate resins of this invention, while it breaks very sharply in the case of polyvinyl acetate as the viscosity is increased to the desirable range.

Example 2

When Example 1 was repeated, using 1% solutions of Half-Second Butyrate in tricresyl phosphate along with varying percentages of polystyrene, the following results were obtained.

| Polystyrene | Viscosity | | Pseudoplastic ratio |
|---|---|---|---|
| | 6 r.p.m. | 60 r.p.m. | |
| 0 | 17,000 | 4,300 | 3.9 |
| 1 | 4,800 | 1,650 | 2.9 |
| 2 | 4,300 | 1,900 | 2.3 |
| 3 | 3,000 | 1,900 | 1.6 |
| 4 | 3,500 | 2,700 | 1.3 |
| 5 | 4,500 | 3,900 | 1.1 |

The reductions in viscosity at 60 r.p.m. when 1% of polystyrene is added to the tricresyl phosphate is an indication of the undesirable effect of the polystyrene on the Half-Second Butyrate. Note how rapidly the pseudoplastic ratio falls off, approaching unity with 5% of polystyrene.

Example 3

An even more important result is shown in the syneresis losses, exemplified in the following example and table. A series of materials were made up in the same manner as Example 1, using the indicated amounts of ingredients shown in the table below.

TABLE II.—LOSS BY SYNERESIS

| | (a) | (b) | (c) | (d) | (e) |
|---|---|---|---|---|---|
| Tricresyl phosphate | 100 | 100 | 100 | 100 | 100 |
| EAB-500-5 (soluble cellulose acetate butyrate) | | 0.5 | | 2.0 | |
| Polyvinyl acetate | | | 2.0 | | |
| Half-second butyrate | | 0.8 | 0.8 | 0.8 | 1.0 |
| Brookfield viscosity (cps. at 60 r.p.m.) | 100 | 3,050 | 3,100 | 9,800 | 4,050 |
| Loss from syneresis: | | | | | |
| Percent 7 days | 53 | 0 | 0.6 | 0 | 4.6 |
| Percent 18 days | 90 | 0 | 1.9 | 0 | 10.0 |

When the soluble acetate butyrate is used in conjunction with the soluble acetate butyrate, there is no syneresis. Triaryl phosphate by itself, with the gelling resin alone, or with the gelling resin together with polyvinyl acetate, shows syneresis losses. Note the complete protection given by 0.5% of the soluble cellulose ester, as compared with the partial improvement with 2% of polyvinyl acetate.

Other liquid triaryl phosphates can be used in place of tricresyl phosphate with essentially similar results. For example, I have used dicresyl-monoxylyl phosphate and trixylyl phosphate and blends of these materials with cresyl diphenyl phosphate. However, care should be taken in using these phosphates to select acetate butyrates which have the correct degree of solvency vis-a-vis the particular aryl phosphate used.

Similarly, the particular cellulose acetate butyrate used must be selected so that one of them will be soluble hot and cold, and the other soluble hot but insoluble cold. In general, as indicated above, the completely soluble resins contain high ratios of butyryl to acetyl in the molecule and the gelling resins contain high ratios of acetyl to butyryl in the molecule.

Obviously, the examples can be multiplied indefinitely without departing from the spirit of the invention, which is defined in the claims.

What is claimed is:

1. A composition suitable for the coating of viscous-impingement air filters characterized by high thixotropy and desirable resistance to syneresis at ordinary ambient temperatures, which consists essentially of 96–99.6% of a triaryl phosphate which is liquid at ambient temperatures, from 0.2–2% of a cellulose acetate butyrate, having a high ratio of butyryl to acetyl, about 48% butyryl to about 6% acetyl, and soluble in the triaryl phosphate at ambient temperatures, and from 0.2–2% of cellulose acetate butyrate gelling agent with a high ratio of acetyl to butyryl, about 37% acetyl to about 13% butyryl, and which is soluble in the triaryl phosphate when hot, but insoluble in ordinary ambient temperatures, said gelling agent being dispersed through the composition in finely divided form.

2. The composition of claim 1 in which the triaryl phosphate is tricresyl phosphate.

3. The composition of claim 2 in which the two acetate butyrates are each present in amounts ranging from 0.5 to 1.5%.

References Cited

UNITED STATES PATENTS 3,161,609  12/1964  Graham _____ 260—17

MORRIS LIEBMAN, Primary Examiner.

H. H. FLETCHER, Assistant Examiner.

U.S. Cl. X.R.

260—30.6